May 21, 1968   J. T. SALIHI   3,384,804
CONTROLLED RECTIFIER INVERTER HAVING SHUTOFF POWER SUPPLIES
Filed May 20, 1965   3 Sheets-Sheet 1

INVENTOR.
Jalal T. Salihi
BY C. R. Meland
His Attorney

Phase Winding 14

Phase Winding 16

Phase Winding 18

May 21, 1968    J. T. SALIHI    3,384,804
CONTROLLED RECTIFIER INVERTER HAVING SHUTOFF POWER SUPPLIES
Filed May 20, 1965    3 Sheets-Sheet 3

INVENTOR.
Jalal T. Salihi
BY C. R. Meland
His Attorney

United States Patent Office 3,384,804
Patented May 21, 1968

3,384,804
CONTROLLED RECTIFIER INVERTER HAVING
SHUTOFF POWER SUPPLIES
Jalal T. Salihi, Santa Barbara, Calif., assignor to General
Motors Corporation, Detroit, Mich., a corporation of
Delaware
Filed May 20, 1965, Ser. No. 457,367
11 Claims. (Cl. 321—5)

ABSTRACT OF THE DISCLOSURE

This invention relates to an inverter for supplying alternating current to an electrical load from a source of direct current. The inverter utilizes a plurality of power controlled rectifiers for controlling the connection of the source of direct current and the electrical load. The controlled rectifiers are turned off by commutating capacitors and direct current shutoff power supplies connected with shutoff controlled rectifiers. The turnoff circuit for a power controlled rectifier excludes the terminals of the main source of direct current and the shutoff power supplies are shunted by a diode and a capacitor.

This invention relates to inverters that may be used to power a three phase induction motor from a source of direct current.

The inverter disclosed in this application is an improvement of the inverter disclosed in application Ser. No. 295,954, filed on July 18, 1963, now Patent 3,323,032 and assigned to the assignee of this invention.

One of the objects of this invention is to provide an inverter for powering a three phase Y-connected motor that does not require a neutral connection for the three phase motor.

Another object of this invention is to provide an inverter that has increased power capability and reliability.

Another object of this invention is to provide an inverter that includes controlled rectifiers for controlling the current supplied to a load such as a three phase motor where the effective shut-off voltage for the controlled rectifiers is greater than with conventional inverters.

Another object of this invention is to provide an inverter that uses controlled rectifiers wherein shutoff power for the controlled rectifiers is derived from the same source of power that supplies the load through the controlled rectifier inverter. In carrying this object forward, the shut-off power supplies may be transistor oscillators that are energized from the main power source.

Another object of this invention is to provide an improved shut-off arrangement for a controlled rectifier inverter.

Still another object of this invention is to provide a controlled rectifier inverter where only relatively small shut-off power sources are required.

A further object of this invention is to provide a shut-off arrangement for a controlled rectifier inverter that uses a diode to provide an easy path for the flow of shut-off energy supplied by commutating condensers of the inverter.

Further objects and advantages of the present invention will be apparent from the following description, reference being had to the accompanying drawings wherein preferred embodiments of the present invention are clearly shown.

Figure 1:
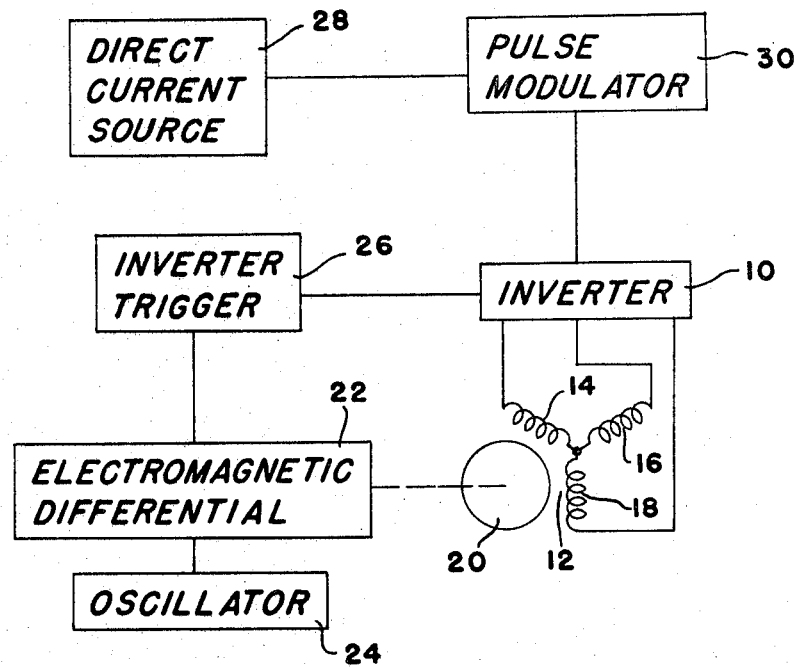
FIGURE 1 is a block diagram illustration of a motor control system that uses the inverter of this invention.

Referring now to the drawings and more particularly to FIGURE 1, a motor control system is illustrated which includes an inverter 10 that feeds a three phase Y-connected induction motor designated by reference numeral 12. The induction motor has phase windings 14, 16 and 18 and a rotor 20. The rotor 20 drives an electromagnetic differential designated by reference numeral 22 which can be of the type disclosed in the above-mentioned patent application, Ser. No. 295,954, filed on July 18, 1963 and now Patent 3,323,032. The electromagnetic differential develops trigger pulses which are a function of motor shaft speed plus a frequency supplied to the electromagnetic differential by an oscillator 24. The output of the electromagnetic differential is fed to an inverter trigger circuit 26 which supplies triggering information to the inverter 10. The inverter 10 is supplied with direct current from a direct current source 28 through a pulse modulator 30. The pulse modulator can be of the type shown in patent application Ser. No. 457,374, filed on May 20, 1965 and assigned to the assignee of this invention, and the triggering circuit for supply triggering information to the inverter 10 can be of the type shown in patent application Ser. No. 457,329, filed on May 20, 1965 and assigned to the assignee of this invention.

The present invention is concerned specifically with the inverter for feeding the three phase winding of the induction motor. This inverter is shown schematically in FIGURE 2 and includes power input conductors 32 and 34 fed from the main source of direct current 36. This source of direct current can be a fixed voltage source or can be a voltage that is supplied by a pulse modulator such as the pulse modulator 30.

Figure 2:
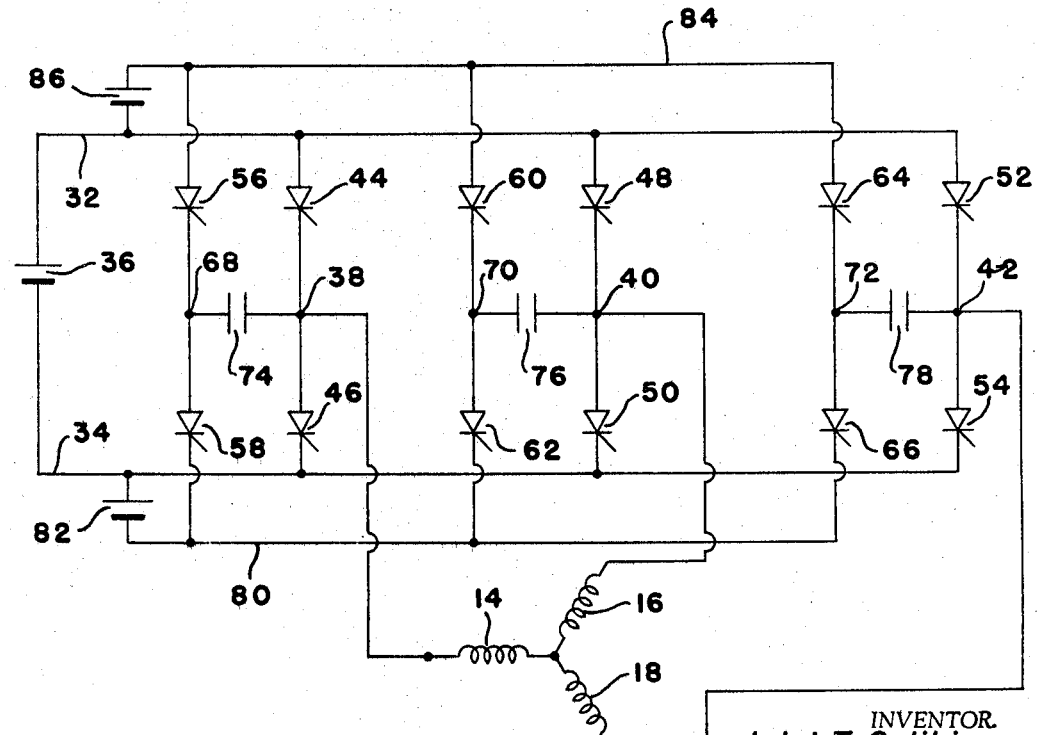
FIGURE 2 is a schematic circuit diagram of an inverter made in accordance with this invention which can be used in the system of FIGURE 1.

The inverter of FIGURE 2 has output terminals 38, 40 and 42. The output terminal 38 is connected with the phase winding 14 of the induction motor whereas output terminals 40 and 42 are connected respectively with phase windings 16 and 18 of the induction motor.

The output terminals of the inverter are connected respectively between power controlled rectifiers 44, 46, 48, 50, 52 and 54. The anodes of controlled rectifiers 44, 48 and 52 are connected with power input line 32 while the cathodes of controlled rectifiers 46, 50 and 54 are connected with the power supply input conductor 34.

The inverter of FIGURE 2 has six shut-off controlled rectifiers 56, 58, 60, 62, 64 and 66. Pairs of these controlled rectifiers are connected respectively with junctions 68, 70 and 72. A plurality of commutating capacitors 74, 76 and 78 are provided which are connected respectively between junctions 68 and 38, 70 and 40 and 72 and 42.

The cathodes of the shut-off controlled rectifiers 58, 62 and 66 are connected with a conductor 80 and a small direct current shut-off power supply which takes the form of a battery 82 is connected between conductor 34 and conductor 80.

The anodes of the shut-off controlled rectifiers 56, 60 and 64 are connected with a conductor 84. A direct current shut-off power supply 86 which takes the form of a battery is connected between conductor 84 and conductor 32.

Figure 3:
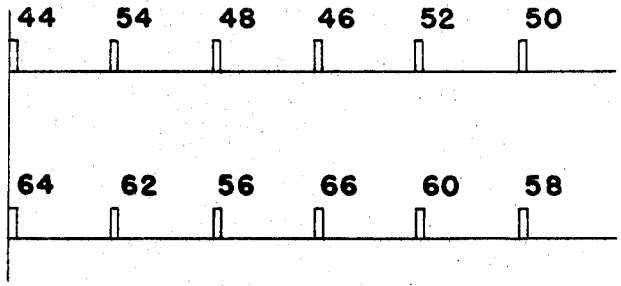
FIGURE 3 is a diagram illustrating the sequence of turn-on and shut-off pulses for the controlled rectifier inverter illustrated in FIGURE 2.

The gate and cathode electrodes of the controlled rectifiers of FIGURE 2 are supplied with triggering pulses of the type shown in FIGURE 3. The triggering pulses in FIGURE 3 have been identified by the same reference numerals as are used in FIGURE 2 to indicate the time when a pulse is applied to a corresponding controlled rectifier to cause that particular controlled rectifier to become conductive.

These pulses are supplied to the inverter by the trigger circuit 26 and the pulses are spaced 60 electrical degrees from each other.

Figure 4:
FIGURE 4 is a diagram illustrating the output current of a three phase inverter of the type shown in FIGURE 2.
Figure 4:
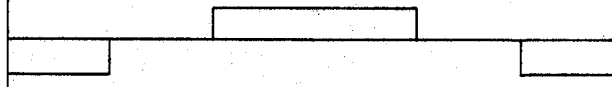
Figure 4:
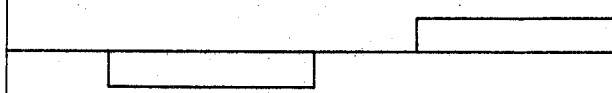

From an inspection of FIGURE 3, it will be appreciated that when pulse 50 is applied to the controlled rectifier 50, this controlled rectifier will be turned on. When pulse 44 is applied to the gate and cathode of controlled rectifier 44, this controlled rectifier will be turned on and a circuit can now be traced for energizing phase windings 14 and 16 which is from the positive side of battery 36, through conductor 32, through controlled rectifier 44, through output terminal 38, through phase windings 14 and 16, through terminal 40, and then through controlled rectifier 50 to an opposite side of the power source 36. The energization of phase windings 14 and 16 during this period is illustrated in FIGURE 4. The wave form is shown as a square wave but it will be understood that this wave shape is modified to some extent from an ideal square wave by the reactive energy of the motor.

It will be appreciated that other conductive paths are provided by the inverter through the phase windings of the motor and by turning on the controlled rectifiers in a sequence as determined by the pulses shown in FIGURE 3, the current flow in the phase windings will be as illustrated in FIGURE 4. This provides a rotating magnetic field in the motor, the frequency of which is determined by the output of the electromagnetic differential 22.

The power controlled rectifiers 44 through 54 are turned off by energy supplied by the commutating capacitors and the shut-off power supplies 82 or 86. Thus shut-off sequence is determined by the shut-off controlled rectifiers 56 through 66 which are fired by trigger control pulses shown in FIGURE 3. As an example, controlled rectifier 44 will be turned off when controlled rectifier 56 is turned on by control pulse 56 shown in FIGURE 3. When control pulse 56 is applied across the gate and cathode of controlled rectifier 56, the controlled rectifier 56 will become conductive and the commutating capacitor 74 will then discharge through a circuit that can be traced from junction 38, through controlled rectifier 44, through the shut-off supply 86, through controlled rectifier 56 and then back to the opposite side of capacitor 74. It can be seen that the voltage available to turn off controlled rectifier 44 will be the voltage of capacitor 74 added to the voltage of the turn-off power supply 86. It also will be appreciated that the turn-off voltage applied to controlled rectifier 44 is not decreased by the voltage of power supply 36 since the turn-off path does not include the main power supply 36. This is an important advantage of the system shown in FIGURE 2 since in prior inverter systems which required a neutral, the turn-off voltage was opposed by the main power supply voltage. This meant that the turn-off power supply had to be larger and the effective shut-off voltage of the inverter shown in FIGURE 2 is greater by the amount of the power supply voltage as compared to prior inverters. In addition, since the main power source is not included in the shut-off circuit, the effective shut-off loop resistance is low resulting in an increased shut-off capability. Moreover, capacitors which are normally connected across the main power source are eliminated with the inverter shown in FIGURE 2.

The shut-off pulses shown in FIGURE 3 are applied to the controlled rectifiers in the sequence illustrated to sequentially provide turn-off loops for the power controlled rectifiers so that the power controlled rectifiers are turned on and off to provide an energization for the phase windings of the motor as depicted in FIGURE 4.

Figure 5:
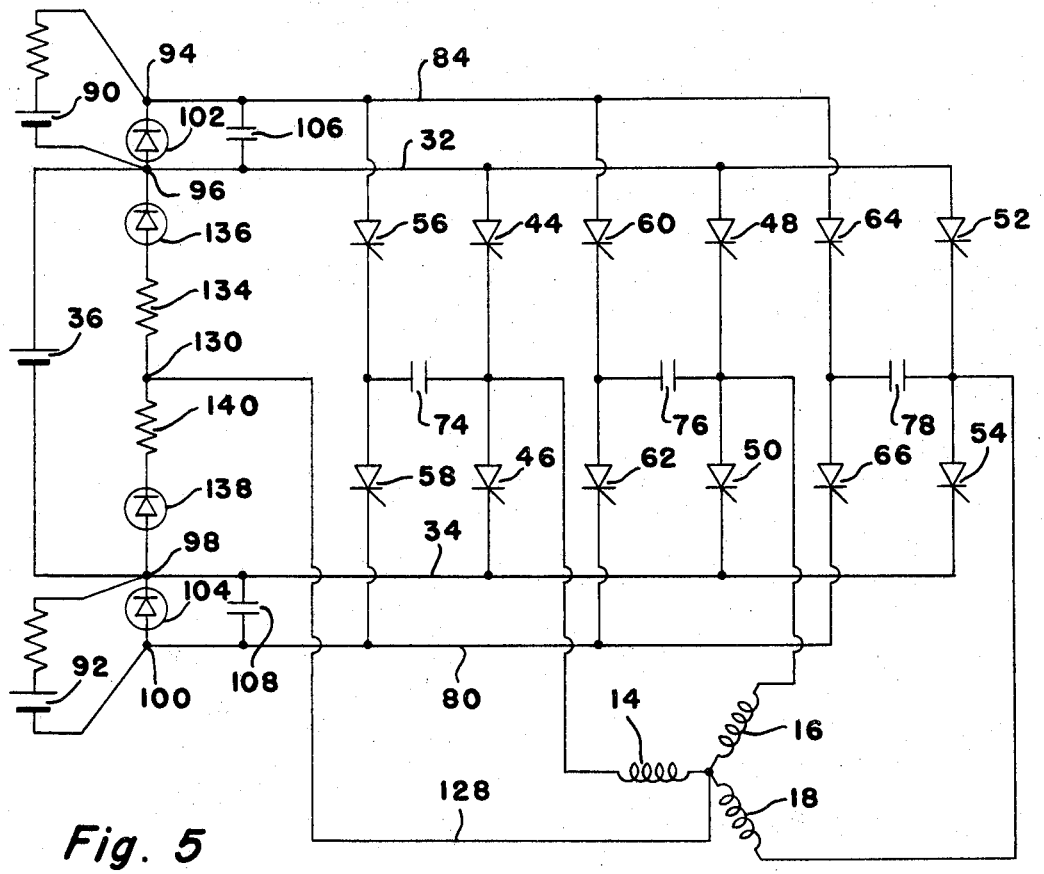
FIGURE 5 is a schematic circuit diagram of a modified inverter made in accordance with this invention.

In starting the inverters shown in FIGURES 2 and 5, six other pulses may be provided which correspond to pulses 44 through 54, but which are displaced 60 degrees after the pulses shown in FIGURE 3. In other words, the starting pulses are applied to the corresponding controlled rectifiers 60 degrees after the main turn-on trigger pulses shown in FIGURE 3. In addition during starting, as shown in the FIGURE 5 arrangement, a neutral connection 128 is provided connected between the neutral of the three-phase induction motor and the junction 130. The junction 130 is connected with power supply conductor 32 through a resistor 134 and a diode 136. The junction 130 is also connected to power supply conductor 34 through diode 138 and resistor 140. Once the motor starts, the starting pulses and neutral connections perform no function and they may be left on.

An alternative method of starting the motor is to make the width of the turn-on pulses for the power controlled rectifier shown in FIGURE 3 (marked 44, 54, 48, 46, 52, 50) 60 degrees or longer; for example, the triggering circuit for supplying triggering information to the inverter 10 can be of the type shown in patent application Ser. No. 457,329 filed concurrently herewith where the duration of the trigger pulses to the power SCR is maintained through 120°.

It is pointed out that the inverter of FIGURE 2 offers the possibility of eliminating the two shut-off sources 82 and 86. This is true in the case of inductive loads storing enough reactive energy to shut-off the power controlled rectifiers 44 through 54. Thus, with certain types of motors, the reactive energy discharged through the commutating condensers can be sufficient to effect shut-off without the help of external shut-off sources. In such a case, the external shut-off sources are only required for starting the motor.

The shut-off power required for starting may be supplied by two small power sources of high internal resistance. This is depicted in the modification of FIGURE 5 where it is seen that the direct current shut-off power supplies 90 and 92 are connected respectively across junctions 94 and 96 and 98 and 100. In FIGURE 5 the same reference numerals have been used as were used in FIGURE 2 to identify corresponding components. A diode 102 is connected between junctions 94 and 96 and another diode 104 connects junctions 100 and 98. The diode 102 is shunted by a capacitor 106 connected between conductor 84 and power supply lead 32. A capacitor 108 shunts the diode 104 and is connected between power input conductor 34 and conductor 80.

In the system of FIGURE 5, the inverter power and shut-off controlled rectifiers are supplied with trigger information of the type shown in FIGURE 3. The shut-off power required for starting in FIGURE 5 as mentioned above is provided by the shut-off power supplies 90 and 92. The diodes 102 and 104 provide a low resistance path to the flow of shut-off energy supplied by the commutating capacitors 74, 76 and 78. In addition, these two diodes isolate the external shut-off sources 90 and 92 from the reactive energy flowing in the shut-off loop.

The capacitors 106 and 108 which are connected across the shut-off power supplies are charged through the high resistance of the shut-off power sources thus accumulating enough energy to provide high shut-off current pulses during starting. The size of capacitors 106 and 108 is comparable to the size of the commutating capacitors 74, 76 and 78.

The voltage developed across the capacitor 106 is determined mainly by the time constant of the internal resistance of power supply 90 and the capacitance of capacitor 106 and the value of the external shutoff voltage provided by source of direct current 90. As the speed of the induction motor increases, the frequency of commutation increases proportionately. This will not allow enough time for capacitor 106 to charge through the high resistance of the source 90 and consequently as the speed of the motor increases, the voltage across the capacitor 106 decreases and becomes negligible at high speeds. In fact, once the motor starts the shutoff, power supplies 90 and 92 may be removed entirely by a suitable switching device.

Figure 6:
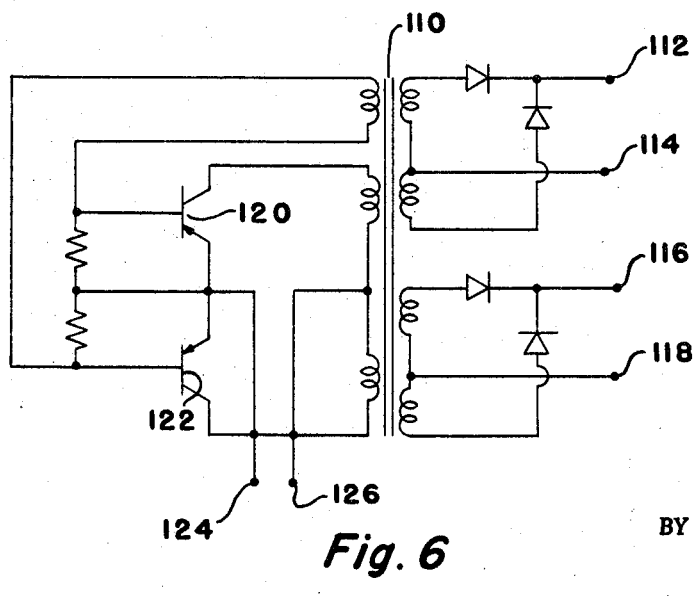
FIGURE 6 is a schematic circuit diagram of a power supply that may be used as the shut-off source of power for an inverter of the type illustrated in FIGURE 5.

The power supplies 90 and 92 can be provided by an auxiliary inverter which is illustrated in FIGURE 6. This inverter includes a transformer 110 having secondary windings feeding output terminals 112 and 114 and 116 and 118. This inverter includes the PNP transistors 120 and 122 connected with the primary windings of the transformer as shown in FIGURE 6.

When using the auxiliary inverter shown in FIGURE 6, the terminals 112 and 114 are connected with terminals 94 and 96 of the inverter and the power supply 90 is removed. In a similar fashion, terminals 116 and 118 are connected with terminals 98 and 100 and the power supply 92 is eliminated. The power input terminals 124 and 126 of the auxiliary inverter shown in FIGURE 6 are connected across the main power supply 36 when using the system of FIGURE 6 for shutoff power.

While the embodiments of the present invention as herein disclosed constitute preferred forms, it is to be understood that other forms might be adopted.

What is claimed is as follows:

1. An inverter for supplying alternating current to an electrical load from a source of direct current comprising, a source of direct current having positive and negative terminals, a pair of input power supply conductors connected with the positive and negative terminals of said source of direct current, a plurality of pairs of power controlled rectifiers, said power controlled rectifiers of each pair series connected across said input power supply conductors with the connection of the anodes and cathodes of said pairs of power controlled rectifiers forming output terminals for said inverter, an electrical load connected with said output terminals, a plurality of pairs of shutoff controlled rectifiers, said controlled rectifiers of each pair of shutoff controlled rectifiers connected in series and having junctions at the connection of the cathode of one shutoff controlled rectifier with the anode of the other controlled rectifiers, a first conductor means connected with the anodes of said shutoff controlled rectifiers, a second conductor means connected with the cathodes of said shutoff controlled rectifiers, a commutating capacitor connected between each output terminal of said inverter and each junction of a pair of shutoff controlled rectifiers, first and second shutoff power sources, circuit means excluding said source of direct current connecting one side of said first shutoff power source with one of said input power supply conductors, means connecting the opposite side of said first shutoff power source with said first conductor means, circuit means excluding said source of direct current connecting one side of said second shutoff power source with the other of said input power supply conductors, and means connecting the opposite side of said second shutoff power supply with said second conductor means, said shutoff power supplies and said commutating capacitors connected in a turn-off loop circuit which turns off a given power controlled rectifier when a given shutoff controlled rectifier is gated conductive, said turn-off loop circuit excluding said source of direct current and including in a series connection, a commutating capacitor, the cathode-anode circuit of a power controlled rectifier, the terminals of one of said shutoff power sources and the anode-cathode circuit of a shutoff controlled rectifier.

2. The inverter according to claim 1 where the shutoff power supplies are provided by an auxiliary inverter having its input connected to said source of direct current.

3. An inverter for supplying alternating current to an electrical load from a source of direct current comprising, a source of direct current having positive and negative terminals, a pair of input power supply conductors connected with the positive and negative terminals of said source of direct current, a plurality of pairs of power controlled rectifiers, said power controlled rectifiers of each pair series connected across said input power supply conductors with the connection of the anodes and cathodes of said pairs of power controlled rectifiers forming output terminals for said inverter, an electrical load connected with said output terminals, a plurality of pairs of shutoff controlled rectifiers, said controlled rectifiers of each pair of shutoff controlled rectifiers connected in series and having junctions at the connection of the cathode of one shutoff controlled rectifier with the anode of the other controlled rectifier, a first conductor means connected with the anodes of said shutoff controlled rectifiers, a second conductor means connected with the cathodes of said shutoff controlled rectifiers, a commutating capacitor connected between each output terminal of said inverter and each junction of a pair of shutoff controlled rectifiers, first and second shutoff power sources, circuit means excluding said source of direct current connecting one side of said first shutoff power source with one of said input power supply conductors, means connecting the opposite side of said first shutoff power source with said first conductor means, circuit means excluding said source of direct current connecting one side of said second shutoff power source with the other of said input power supply conductors, means connecting the opposite side of said second shutoff power supply with said second conductor means, said shutoff power supplies and said commutating capacitors connected in a turn-off loop circuit which turns off a given power controlled rectifier when a given shutoff controlled rectifier is gated conductive, said turn-off loop circuit excluding said source of direct current and including in a series connection, a commutating capacitor, the cathode-anode circuit of a power controlled rectifier, the terminals of one of said shutoff power sources and the anode-cathode circuit of a shutoff controlled rectifier, a diode connected across each of said shutoff power sources and a capacitor connected across each diode.

4. The inverter according to claim 3 where the first and second shutoff power supplies are provided by an electrical circuit having an input connected to said source of direct current and two direct current outputs providing the first and second shutoff power supplies.

5. A power supply system for an induction motor having a polyphase winding comprising, a source of direct current having positive and negative terminals, a pair of power supply input conductors connected respectively with the positive and negative terminals of said source of direct current, a plurality of pairs of power controlled rectifiers, said power controlled rectifiers of each pair connected in series across said power supply conductors, the common junctions of said power controlled rectifiers forming output terminals for said inverter, means connecting said output terminals with the phase windings of said polyphase winding of said motor, a plurality of pairs of shutoff controlled rectifiers, said controlled rectifiers of each pair of shutoff controlled rectifiers connected in series and each pair of shutoff controlled rectifiers having a common junction, a commutating capacitor connected between each output terminal of said inverter and each junction of said pairs of shutoff controlled rectifiers, first and second turn-off power supplies, and means connecting each turn-off power supply in a loop circuit with a shut-off and a power controlled rectifier and with a commutating capacitor, each loop circuit excluding said source of direct current and including one of said commutating capacitors, a cathode-anode circuit of a power controlled rectifier, one of said turn-off power supplies and the anode-cathode circuit of a controlled rectifier.

6. A motor control system according to claim 5 where said turnoff power supplies are provided by an auxiliary inverter which has its input terminals connected with said source of direct current.

7. A power supply system for an induction motor having a polyphase winding comprising, a source of direct current, an induction motor having a polyphase winding, a pair of power supply input conductors connected respectively with positive and negative terminals of said source of direct current, a plurality of pairs of power controlled rectifiers, said power controlled rectifiers of each pair series connected across said input power supply conductors with the connection of the anodes and cathodes of said pairs of power controlled rectifiers forming output terminals, means connecting each output terminal of each pair of power controlled rectifiers respectively with a phase winding of said polyphase induction motor winding, first and second shutoff power supplies, circuit means excluding said source of direct current connecting said first shutoff power supply between one of said power supply input conductors and a first conductor, circuit means excluding said source of direct current connecting the other of said shutoff power supplies between said other power supply input conductor and a second conductor, a plurality of pairs of shutoff controlled rectifiers connected across said first and second conductors, said controlled rectifiers of each pair of shutoff controlled rectifiers being connected in series and having common junctions, a commutating capacitor connected between each output terminal of said pairs of power controlled rectifiers and a junction of a pair of shutoff controlled rectifiers, a diode connected across each shutoff power supply, and a capacitor connected across each diode.

8. An inverter for supplying alternating current to an electrical load from a source of direct current comprising, a source of direct current, a pair of power input conductors connected across said source of direct current, a pair of diodes series connected across said power input conductors having a first common junction, a plurality of pairs of power controlled rectifiers connected across said power input conductors, said controlled rectifiers of each pair being connected in series and having common junctions forming output terminals, a three phase Y-connected load, means connecting said output terminals respectively with said Y-connected load, a conductor connecting the neutral of said Y-connected load and said first junction, first and second shutoff power supplies, circuit means excluding said source of direct current connecting said first shutoff power supply between one of said input conductors and a first conductor, circuit means excluding said source of direct current connecting said second shutoff power supply between the other of said input conductors and a second conductor, a plurality of pairs of shutoff controlled rectifiers connected across said first and second conductors, said shutoff controlled rectifiers of said pairs of shutoff controlled rectifiers being series connected and having a common junction, and a plurality of commutating capacitors, each commutating capacitor being connected between a junction of said pairs of shutoff controlled rectifiers and one of said output terminals, said first and second conductors each forming parts of loop circuits for carrying turnoff currents for said power controlled rectifiers, said loop circuits excluding said source of direct current.

9. The inverter according to claim 8 where the three phase Y-connected load is the primary winding of a three phase induction motor.

10. The inverter according to claim 8 where each shutoff power supply is shunted by a diode and a capacitor.

11. A power supply system for feeding an induction motor having a polyphase winding from a source of direct current comprising, a source of direct current, a polyphase induction motor having a polyphase winding, an inverter including first and second input power supply conductors connected across said source of direct current, a plurality of pairs of power controlled rectifiers, said power controlled rectifiers of each pair series connected across said input power supply conductors, the common junction of each pair of power controlled rectifiers forming an output terminal for said inverter, means connecting each output terminal of said inverter respectively with a phase winding of said polyphase motor winding, first and second conductors, a plurality of pairs of shutoff controlled rectifiers series connected across said first and second conductors, each pair of shutoff controlled rectifiers having a common junction, a commutating capacitor connected between each junction of a pair of shutoff controlled rectifiers and each output terminal of said inverter, an auxiliary inverter having an input connected with said source of direct current and an output providing first and second direct current shutoff power sources, circuit means excluding said source of direct current connecting said first shutoff power source between said first conductor and one of said input power supply conductors, circuit means excluding said source of direct current connecting said second shutoff source between the other input power supply conductor and said second conductor and a diode and a capacitor shunting each shutoff power source.

References Cited

UNITED STATES PATENTS

| | | | |
|---|---|---|---|
| 3,207,974 | 9/1965 | McMurray | 321—45 |
| 3,213,287 | 10/1965 | King. | |
| 3,262,036 | 7/1966 | Clarke et al. | |
| 3,315,144 | 4/1967 | Poss | 321—45 XR |
| 3,315,145 | 4/1967 | Menard | 321—44 |
| 3,321,697 | 5/1967 | Etter | 321—45 |

JOHN F. COUCH, *Primary Examiner.*

W. M. SHOOP, *Assistant Examiner.*